Figure 1:
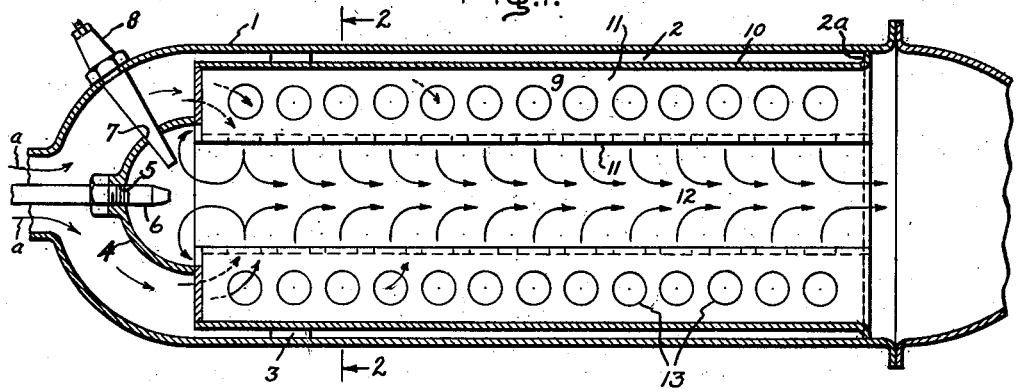

July 7, 1953  R. K. KIDD  2,644,302
COMBUSTION CHAMBER HAVING A FLAT WALL LINER
WITH OPPOSITELY DISPOSED APERTURES
Filed June 17, 1948

Inventor:
Robert K. Kidd
by Harry R. Mayers
His Attorney.

Patented July 7, 1953

2,644,302

UNITED STATES PATENT OFFICE 2,644,302

COMBUSTION CHAMBER HAVING A FLAT WALL LINER WITH OPPOSITELY DISPOSED APERTURES

Robert K. Kidd, Schenectady, N. Y., assignor to General Electric Company, a corporation of New York Application June 17, 1948, Serial No. 33,472

3 Claims. (Cl. 60—39.65)

My invention relates to combustion chambers and more particularly to a combustion chamber construction for a jet propulsion engine.

In general, the inner liner of a combustion chamber construction is formed by a surface of rotation (a cylindrical surface being particularly popular) in which are a plurality of holes for the admission of the combustion air to the region where combustion takes place. In order to have efficient burning it is desirable that the mixture of the air and fuel within the region bounded by the cylindrical surface of the combustion chamber liner be very turbulent. It has been found that impingement of the entering air through oppositely placed holes in the wall of the combustion chamber liner increases the turbulence in the combustion chamber. The combustion process itself contributes to the turbulence of the gases within the combustion chamber. However, with the type of combustion chamber liner now in use, such turbulence takes place more prominently in the center portion of the burner and away from the burner walls. There is somewhat less turbulence near the walls of the combustion chamber liner and because of this fact, incomplete combustion takes place near the walls and large carbon deposits are made on the walls of the liner. These deposits cause hot spots which often are the cause of subsequent failure of the combustion chamber liner. A method that has been used to remedy this situation is to perforate the walls of the liner in such a way as to form a great plurality of louvers (which are essentially lips or scoops) for scooping up the air as it passes the outer surface of the wall of the combustion chamber liner. This air scooped up by the louvers forms a thin film of cooling and insulating air on the inner surface of the liner and prevents the fuel laden air from contacting the wall of the liner and leaving carbon deposits. While such louvers, when properly arranged, are effective the use of this great plurality of louvers structurally weakens the combustion chamber liner and shortens its operating life.

If the fuel to be burned in the combustion chamber is in the form of minute solid particles, such as pulverized coal, further problems arise. It is necessary that the time spent in the combustion chamber by the coal particles be in regions of high turbulence and great temperatures. In an ordinary cylindrical type burner a large part of the coal particles would be only partially burned in the less turbulent regions of the combustion chamber next to the wall. If a greater region of turbulence was provided, the efficiency of burning of coal particles as a fuel would be greatly increased.

The length of a combustion chamber depends in one measure upon the speed of combustion of the fuel in that sufficient length must be provided so that a moving mixture of fuel and air may be nearly completely combusted at the exit of the combustion chamber. One of the factors in efficiency of combustion is the turbulence in the combustion chamber, greater turbulence resulting in greater combustion efficiency. Thus, shorter burners result if greater gas turbulence can be achieved.

Combustion chambers usually consist of an outer combustion chamber shell and an inner combustion chamber liner. The passageway between the outer and inner shell is for the incoming compressed combustion air. The use of two shells is a heavier construction than would be a single shell structure, and also takes up more space than would a single shell structure.

One of the objects of my invention is to provide a combustion chamber liner which will have high turbulent air near the wall surfaces thus increasing the ability of the burner to handle more fuel.

Another object of my invention is to provide a combustion chamber which has no tendency to build up carbon formations on its walls.

Another object of my invention is to provide a combustion chamber liner in which no louvers are necessary.

Another object of my invention is to provide a combustion chamber liner which is very strong structurally and not subject to failures due to weakened shell structure.

Another object of my invention is to provide a combustion chamber in which there are many regions in which great turbulent burning takes place.

Another object of my invention is to provide a shorter combustion chamber.

Another object of my invention is to provide a single shell combustion chamber construction.

Further objects and advantages of my invention will become apparent as the following description proceeds and the features of novelty which characterize my invention will be pointed out with particularity in the claims annexed to and forming a part of this specification.

Figure 2:
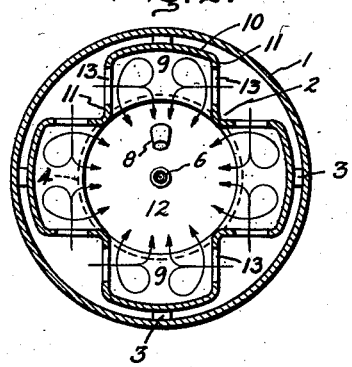
Figure 3:
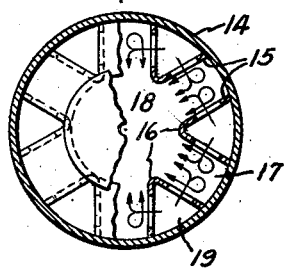

In the drawing Fig. 1 shows a combustion chamber construction for a jet propulsion engine having a combustion chamber outer shell and a combustion chamber liner embodying the developments hereinafter described. Fig. 1 also shows diagrammatically the path that incoming air takes within the combustion chamber and the liner. Fig. 2 is a cross sectional view of Fig. 1 at section 2—2 showing more clearly in detail the invention and also showing diagrammatically the turbulence that incoming air takes on within the combustion chamber liner. Fig. 3 shows a modification of my invention and is a cross section view of a single shell type combustion chamber construction.

In Fig. 1, I have shown a combustion chamber construction for a jet propulsion engine in which the outer combustion chamber shell is designated 1. Mounted within this outer shell is an inner shell or combustion chamber liner 2. The two shells are so shaped and so mounted as to form a passageway between the two shells for carrying air to the inner shell where the burning takes place. Spacers 3 are provided for the concentric alignment of the two shells.

The combustion chamber liner 2 has at one end a head 4 within which is a port 5 into which is inserted fuel inlet nozzle 6, and a port 7 into which is inserted ignition means 8. The combustion chamber liner 2 consists of a cylinder which has been creased and crimped at a plurality of points so as to form a plurality of combustion sections 9 which are bounded by an arcuate section 10 and by two substantially parallel flat surfaces 11. Each combustion section 9 is then open along its entire length to a cylindrical combustion region 12 within the combustion chamber liner which is coaxial with the axes of the outer and inner shells and which is common in position to all the combustion sections. The combustion sections are circumferentially disposed about this common coaxially lying cylindrical combustion region. Each flat surface 11 has punched in it a plurality of air inlet holes 13 so placed and spaced that the holes 13 in any surface 11 are opposite to similar holes 13 in the corresponding parallel section 11.

The inner combustion chamber liner shell 2 has at one end a flange 2a as shown in Fig. 1. This flange extends from every point on the end periphery of shell 2 to every point on the inner periphery of the outer shell 1. Flange 2a serves a plurality of purposes. It serves both to center the inner shell 2 within the outer shell 1 and also serves as a support of the combustion chamber liner within outer shell 1. It further serves to prevent combustion air from passing beyond the combustion chamber as it blocks off all the passageways through which the combustion air flows. However, it leaves open-ended the combustion sections from which issue the gasous products of combustion.

In operation, fuel is injected into the combustion chamber liner head through nozzle 5 and mixes with the air therein. The mixture is ignited by the ignition means 8 (usually a spark plug). The excess fuel and the burning mixture passes down the length of the combustion chamber liner 2 towards the open end of the liner. In the meantime combustion air as represented and shown by the arrows *a* in Fig. 1 is introduced into the combustion chamber outer shell. This air moves in the direction indicated by the arrows and completely surrounds the combustion chamber liner. This air for combustion enters the liner through the holes 13 in the walls 11 of the liner. The holes face each other so that the incoming air from one hole encounters the incoming air from a hole opposite. The result is a very turbulent region. This turbulent air is mixed with the excess fuel and now this mixture burns resulting in further local turbulence next to the arcuate surface which forms the third wall of a combustion channel that is open to the common central portion of the burning chamber. The turbulence and mixing is illustrated by the diagrammatic indicating arrows shown in Figs. 1 and 2.

Due to the very high turbulence immediately next to the arcuate surfaces there is little tendency for carbon deposits to be made on the surfaces and therefore louvers are unnecessary in this type of combustion chamber liner. The liner is now broken up into many regions of great turbulence and as such, the capacity for, and efficiency of, combustion in the liner is increased. Thus, in comparing a liner of this type with another of equivalent combustion volume it will be found that this one is more efficient and can handle greater amounts of fuel, or for similar amounts of fuel the efficiency of combustion of this chamber is greater and hence a shorter one may be used. Since no louvers are required in the liner it is stronger structurally and its operation life is greater.

The modification of my invention shown in Fig. 3 is substantially a cylinder 14 having a plurality of pairs of substantially parallel flat walls 15 running along the entire lengths of the cylinder and attached to the inside surface of the cylinder. The adjacent walls of successive pairs of parallel walls are joined together either one to the other or by some other wall. As shown in Fig. 3 adjacent walls are joined one to the other at joints 16 thus forming two differently shaped sets of channels. One set of channels 17 are open along their entire length to a coaxially lying cylindrical combustion region 18. The other set of channels 19 carry the incoming combustion air. The channels are circumferentially disposed within the cylinder and are alternated one with the other as shown in Fig. 3.

It will be noted that by the use of a single shell as shown in Fig. 3 a structure is provided which has all the inherent strength of a cylinder and which provides a plurality of channels down which the entering combustion air may flow and a plurality of turbulent burning channels of the type previously described. This type of construction obviates the need of a two shell construction consisting of an outer shell and an inner combustion chamber liner. The structure shown serves the entire purposes of such a two shell construction and the resultant structure is stronger and lighter than previous structures.

While I have shown and described a particular embodiment of my invention it will be obvious to those skilled in the art that various changes and modifications may be made without departing from my invention in its broad aspects and I, therefore, aim in the appended claims to cover all such changes and modifications as fall within the true spirit and scope of my invention.

What I claim as new and desire to secure by Letters Patent of the United States is:

1. A combustion chamber comprising an outer combustion chamber shell, an inner shell closed at one end and open for the discharge of reaction products at the other end mounted substantially concentric within said outer shell, means for introducing combustion air into the coaxial passageway formed by the said two concentric shells, means for introducing fuel into the space enclosed within the said inner shell, said inner shell comprising a plurality of lengthwise running combustion channels circumferentially spaced about a common cylindrical coaxially lying combustion passageway, said lengthwise running combustion channels being open along their entire length to said common cylindrical coaxially lying combustion passageway, each lengthwise running combustion channel comprising a pair of substantially parallel flat walls each having a row of oppositely disposed apertures therein, the width of each aperture being about half the width of the flat wall in which each aperture is located for permitting the combustion air to enter into the space enclosed by said inner shell.

2. A combustion chamber comprising an outer combustion chamber shell, an inner shell closed at one end and open for the discharge of reaction products at the other end mounted substantially concentric within said outer shell, means for introducing combustion air into the coaxial passageway formed by the said two concentric shells, means for introducing fuel into the space enclosed within the said inner shell, said inner shell comprising a plurality of lengthwise running combustion channels circumferentially spaced about a common cylindrical coaxially lying combustion passageway, said lengthwise running combustion channels being open along their entire length to said common cylindrical coaxially lying combustion passageway, each lengthwise running combustion channel comprising a pair of substantially parallel flat walls having circular inlet openings therein of a diameter substantially half the distance across the flat channel wall for permitting the combustion air to enter into the space enclosed by said inner shell, each air inlet opening in one flat wall section being opposite another air inlet opening in the other member of the pair of said parallel wall sections, so that discrete jets of the fluid reactant produced by the inlet openings impinge upon each other within the said combustion channels to create and enhance turbulent mixing of the fuel mixture thereby improving combustion conditions, and means for igniting the combustion fuel mixture within said inner shell.

3. A combustion chamber liner closed at one end and open for the discharge of reaction products at the other end comprising a plurality of distinct lengthwise running combustion channels circumferentially placed about a common cylindrical coaxially lying combustion passageway, said lengthwise running combustion channels being open along their entire length to said common cylindrical coaxially lying combustion passageway, each lengthwise running channel having a plurality of air inlet holes located therein for permitting the combustion air to enter into the combustion channels, each air inlet hole being so placed as to be substantially opposite to and facing another air inlet hole located in the opposing wall of the same lengthwise running channel and having a large area whereby air entering one hole impinges on air entering from its oppositely disposed hole to form a symmetrical turbulence pattern within the chamber.

ROBERT K. KIDD.

References Cited in the file of this patent

UNITED STATES PATENTS

| Number | Name | Date |
|---|---|---|
| 2,164,954 | Stephens | July 4, 1939 |
| 2,268,464 | Seippel | Dec. 30, 1941 |
| 2,326,072 | Seippel | Aug. 3, 1943 |
| 2,417,445 | Pinkel | Mar. 18, 1947 |
| 2,457,157 | King | Dec. 28, 1948 |
| 2,458,497 | Bailey | Jan. 11, 1949 |
| 2,477,583 | DeZubay et al. | Aug. 2, 1949 |
| 2,488,911 | Hepburn | Nov. 22, 1949 |
| 2,517,015 | Mock et al. | Aug. 1, 1950 |
| 2,560,401 | Allen | July 10, 1951 |